US006822833B2

(12) United States Patent
Yang et al.

(10) Patent No.: US 6,822,833 B2
(45) Date of Patent: Nov. 23, 2004

(54) DISC DRIVE MAGNETIC COMPONENT WITH SELF ASSEMBLED FEATURES

(75) Inventors: Xiaomin Yang, Sewickley, PA (US); Andrew Robert Eckert, Pittsburgh, PA (US); Chao Liu, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 95 days.

(21) Appl. No.: 10/277,772

(22) Filed: Oct. 22, 2002

(65) Prior Publication Data

US 2003/0235008 A1 Dec. 25, 2003

Related U.S. Application Data

(60) Provisional application No. 60/390,743, filed on Jun. 21, 2002.

(51) Int. Cl.$^7$ .......................... G11B 5/147; G11B 7/24; G11B 23/03
(52) U.S. Cl. ...................................... 360/126; 720/718
(58) Field of Search ................................ 360/126, 125, 360/110; 720/718; 369/272.1, 272

(56) References Cited

U.S. PATENT DOCUMENTS

| | | | | |
|---|---|---|---|---|
| 5,079,600 A | * | 1/1992 | Schnur et al. ............... | 257/750 |
| 5,510,628 A | * | 4/1996 | Georger et al. ............... | 257/32 |
| 5,514,501 A | | 5/1996 | Tarlov ............................ | 430/5 |
| 5,728,431 A | | 3/1998 | Bergbreiter et al. ....... | 427/388.1 |
| 6,146,767 A | | 11/2000 | Schwartz ..................... | 428/457 |
| 6,197,399 B1 | * | 3/2001 | Naito et al. ................ | 428/64.1 |
| 6,686,017 B2 | * | 2/2004 | Ogawa ....................... | 428/64.1 |

FOREIGN PATENT DOCUMENTS

EP    0 853 311 A1    7/1998

OTHER PUBLICATIONS

Anders S. et al.: "Lithography and self-assembly for nanometer scale magnetism", Microelectronic Engineering, Elsevier Publishers, BV., Amsterdam, NL, vol. 61-62, Jul. 2002, pp. 569-575, XP004360586, ISSN: 0167-9317.
Article from the Applied Physics Letters, vol. 78, No. 18, dated Apr. 30, 2001, pp. 2760-2762, entitled "Fabrication of <5 nm width lines in poly(methylmethacrylate) resist using a water:isopropyl alcohol developer and ultrasonically-assisted development",Yasin et al.
Article from J. Vac. Sci. Technol. B 13(4), Jul./Aug. 1995, pp. 1473-1476, entitled "Fabrication of sub-10-nm silicon lines with minimum fluctuation",Namatsu et al.
Article from Macromolecules 2000, 33, 9575-9582, American Chemical Society, Published on Web Dec. 26, 2000, entitled "Guided Self-Assembly of Symmetric Diblock Copolymer Films on Chemically Nanopatterned Substrates", Yang et al.
Article from Langumuis 2001, 17, pp. 228-233, American Chemical Society, entitled "Proximity X-ray Lithography Using Self-Assembled Alkylsiloxane Films: Resolution and Pattern Transfer",Yang et al.
Article from J. Phys. Chem. B. 2000, 104, 7403-7410, 2000 American Chemical Society, entitled "Chemical Modification of Self-Assembled Monolayers by Exposure to Soft X-rays in Air",Kim et al.

* cited by examiner

Primary Examiner—Julie Anne Watko
(74) Attorney, Agent, or Firm—Westman, Champlin & Kelly

(57) ABSTRACT

A component for use in a disc drive includes a component substrate having a substrate surface. A self-assembled image layer is formed over the substrate surface. The self-assembled image layer includes a developed region defining a feature with a developed width. Each component also includes a feature layer that is self-assembled over the image layer. The feature layer is joined by a self-assembly process to the developed region. The feature layer has a feature width that is limited to the developed width.

29 Claims, 10 Drawing Sheets

DISC DRIVE MAGNETIC COMPONENT WITH SELF ASSEMBLED FEATURES

CROSS-REFERENCE TO RELATED APPLICATION

This application claims priority from U.S. Provisional Application No. 60/390,743 filed on Jun. 21, 2002 for inventors Xiaomin Yang, Andrew R. Eckert and Chao Liu and entitled "Magnetic Nanohead Fabrication Based on Two Levels of Molecular Self-Assembly: Self-Assembled Monolayers and Ordering of Magnetic Nanoparticles".

FIELD OF THE INVENTION

The present invention relates generally to disc drive components, and more particularly but not by limitation to providing component features that have narrow widths.

BACKGROUND OF THE INVENTION

In the manufacture of a disc drive, write transducers are usually deposited in multiple layers on a trailing edge of a slider using thin film techniques. For many of the layers, thin film lithography is used to define widths of component features.

As illustrated in PRIOR ART FIG. 2, a typical thin film lithographic process 20 begins at step 22 where a layer of radiation-sensitive material, also called positive resist material 24, is deposited on a substrate or layer 26 which is to receive a deposit of metal having a desired shape. At step 28, the positive resist material 24 is exposed to radiation 30 through a mask 32, and then the positive resist material 24 is baked. The radiation 31 that passes through an opening in the mask 32 and the baking process alter the chemical properties of the positive resist material in an exposed region 34. The radiation 31 transfers the opening pattern in the mask to the positive resist material 24. Next, at step 36, the positive resist 24 is developed in a solvent that washes away the altered positive resist in the exposed region 34, leaving a slit 38 in the positive resist 24 with a shape defined by the mask 32. Next, at step 42, an electroplated feature 44 is electroplated in the slit 38. The shape of the electroplated feature 44 is defined by the shape of the slit 38 that is, in turn defined by the shape of an opening in mask 32. After formation of the feature 44, which is typically a pole tip, the remaining positive resist 24 is stripped, leaving the desired feature 44 deposited on layer 26 as shown at step 45.

As illustrated at inset illustration 46, the feature 44 is an integral narrow central portion of a larger "dog bone" shaped thin film deposit 48. The feature 44 is later lapped along a line 50 to form a write pole tip.

It is known by those skilled in the art that the slit 38 can be used, alternatively, to etch a pattern in the underlying layer 26 instead of being used to electroplate a feature. It is also known by those skilled in the art that a negative type resist can be used rather than using a positive resist. With a negative type resist, regions that are exposed to radiation become cross-linked, and the unexposed regions of the negative resist are washed away in step 36 rather than the exposed regions of the resist. Various negative type and positive type resists, electroplating processes and etchants are commercially available to perform various thin film lithographic processes.

There is a desire to use thin film lithographic techniques to define increasingly narrower widths of various disc drive components such write pole tips. As areal densities of data stored on discs increases to more than one terabit per square inch, there is a need to reduce the width of write pole tips and other features to less than 30 nanometers in order to accommodate this higher areal density. It is found, however, that known thin film lithographic techniques are not able to reliably provide features with widths less than 30 nanometers in a mass production environment.

There is thus a need for providing disc drive components having features such as pole tips and read heads with widths less than 30 nanometers that can be reliably produced in a mass production environment.

SUMMARY OF THE INVENTION

Disclosed are components for use in a disc drive that include a component substrate having a substrate surface. A self-assembled image layer comprising an organic monolayer is formed over the substrate surface. The self-assembled image layer includes a self-assembled developed region defining a developed width.

Each component also includes a feature layer that is self-assembled over the self-assembled image layer. The feature layer is joined by a self-assembly bond to the self-assembled developed region in the image layer. The feature layer has a feature width that is limited to the developed width.

These and other features and benefits that characterize embodiments of the present invention will be apparent upon reading the following detailed description and review of the associated drawings.

DETAILED DESCRIPTION OF ILLUSTRATIVE EMBODIMENTS

Figure 1:
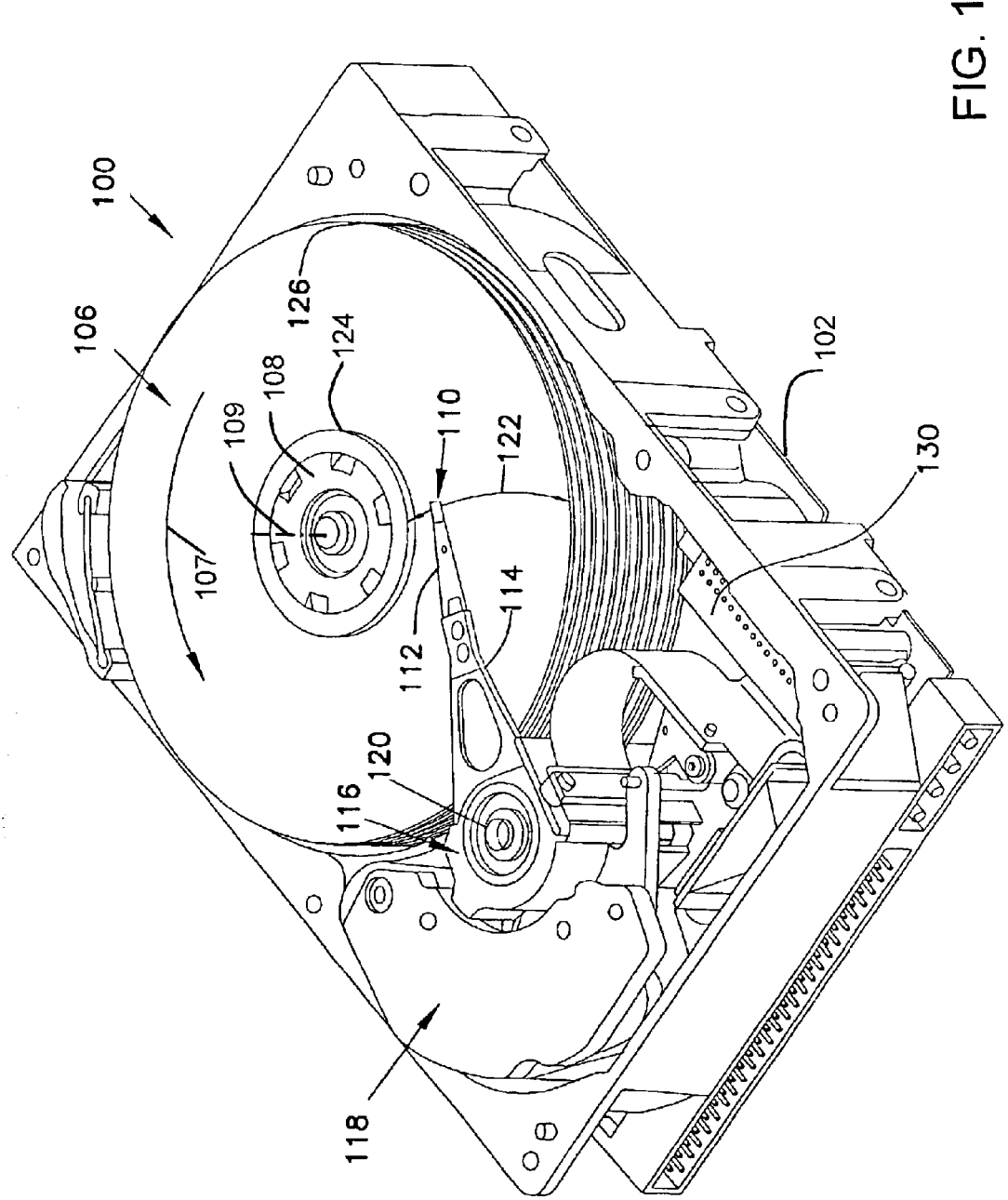
FIG. 1 is an oblique view of a disc drive.
Figure 2:
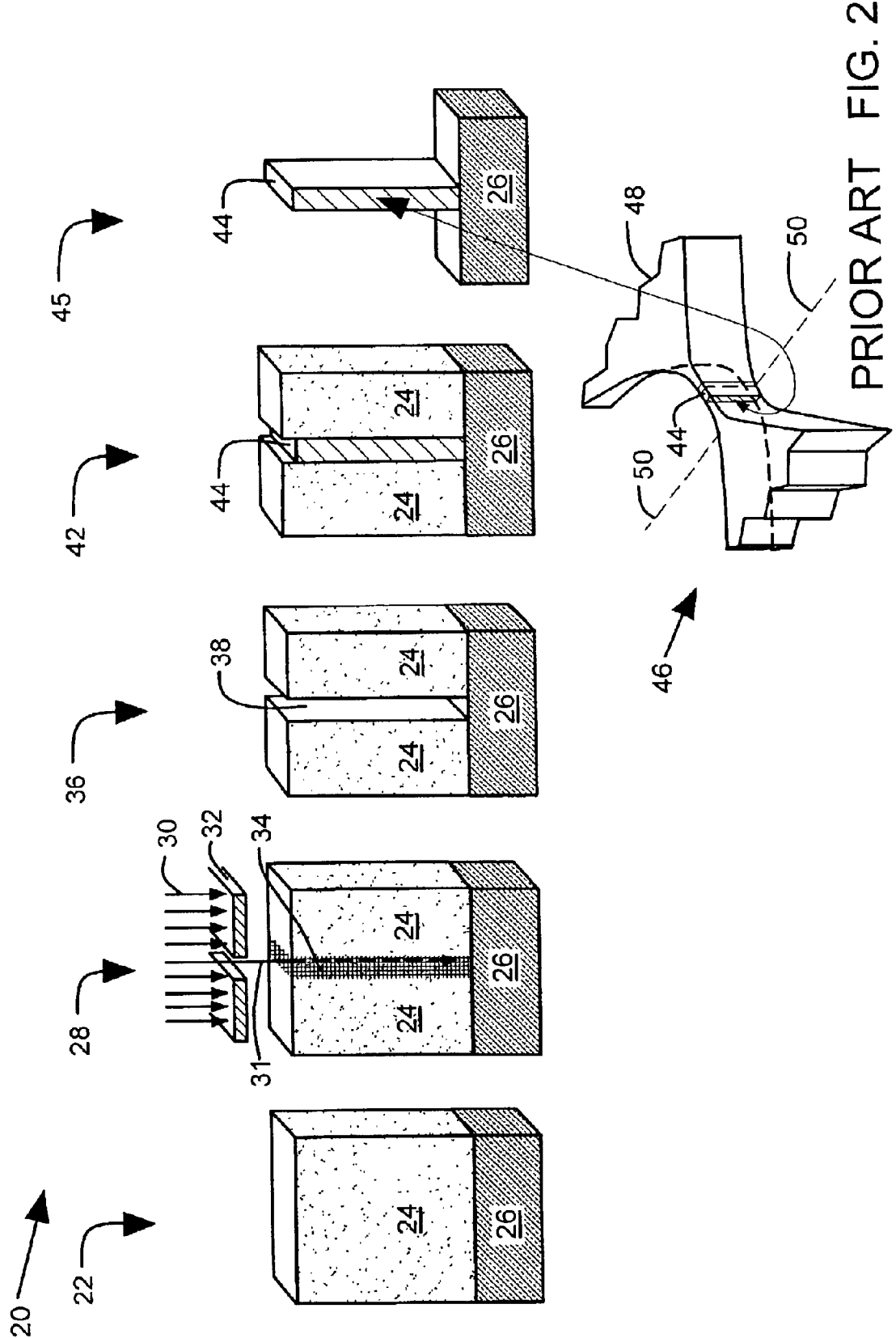
FIG. 2 schematically illustrates a PRIOR ART thin film deposition process.

In order to achieve an areal density higher than 1 terabit/$in^2$, the width of the write pole tip described below in FIGS. 3–10 is generally on the order of 30 nm or even smaller. Additionally, a large aspect ratio of about 10:1 or more is achieved for write pole tips to obtain sufficient magnetic fields in the magnetic media. Unfortunately, current thin film lithographic techniques have not shown this capability can be reliably achieved at a reasonable cost in a mass production environment. Feature size as small as 10 nm can be produced with electron beam writing, but to date, electron beam processes with current resist systems have not reached the targeted aspect ratio of 10:1 with critical dimensions less than 30 nm in a mass production environment. Lithographies based on shorter wavelength radiation, for example extreme ultraviolet (EUV) and X-ray lithography (XRL), have the required resolution, but no satisfactory resist materials exists for applications below 50 nm. One problem is that current resist systems rely on kinetic processes such as diffusion and dissolution. In order to maintain good linewidth and linewidth control, the processes must be optimized with respect to many process parameters, such as time and temperature. However, these kinetically controlled processes cannot be practically extrapolated in the 10 nm regime because of vanishingly small manufacturing tolerances and margins. New process systems for the 10-nm regime are needed to produce features on the order of single molecule dimensions with tolerances and margins of atomic dimensions.

As mentioned above, current kinetically controlled process may not be able to achieve the molecular dimensions with tolerances and margins of atomic dimensions.

One aspect of the present solution to the problem is to use a thermodynamic process instead of a kinetic process to fabricate narrow width features such as a magnetic recording nanohead. Self-assembly processes are used to fabricate the magnetic devices with widths going down to the sub-10 nm region. The self-assembly processes disclosed here can be used to fabricate features at the molecular scale because it leads to equilibrium structures that are at (or close to) thermodynamic minimum.

Advanced lithography is combined with self-assembly principles. Two levels of molecular self-assembly are used to fabricate very narrow features: self-assembled monolayers (SAMs) as an image layer and ordering of magnetic nanoparticles as a feature layer. The nanoparticles are used as building blocks to build functional nanostructures. The formation of the nanostructure is controlled by two interfacial interactions: particle-substrate interaction, and particle-particle interaction.

A typical assembly process to form functional nanostructures includes: (1) deposition of a self-assembled (SA) organic monolayer as an image layer on a substrate; (2) chemically patterning the image layer with electron beam lithography; (3) synthesis of FeCo nanoparticles, and (4) self-assembly of FeCo into chemically patterned SA films. The features and processes are explained by way of examples in FIGS. 3–10.

FIG. 1 is an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109 in a direction indicated by arrow 107. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 3:
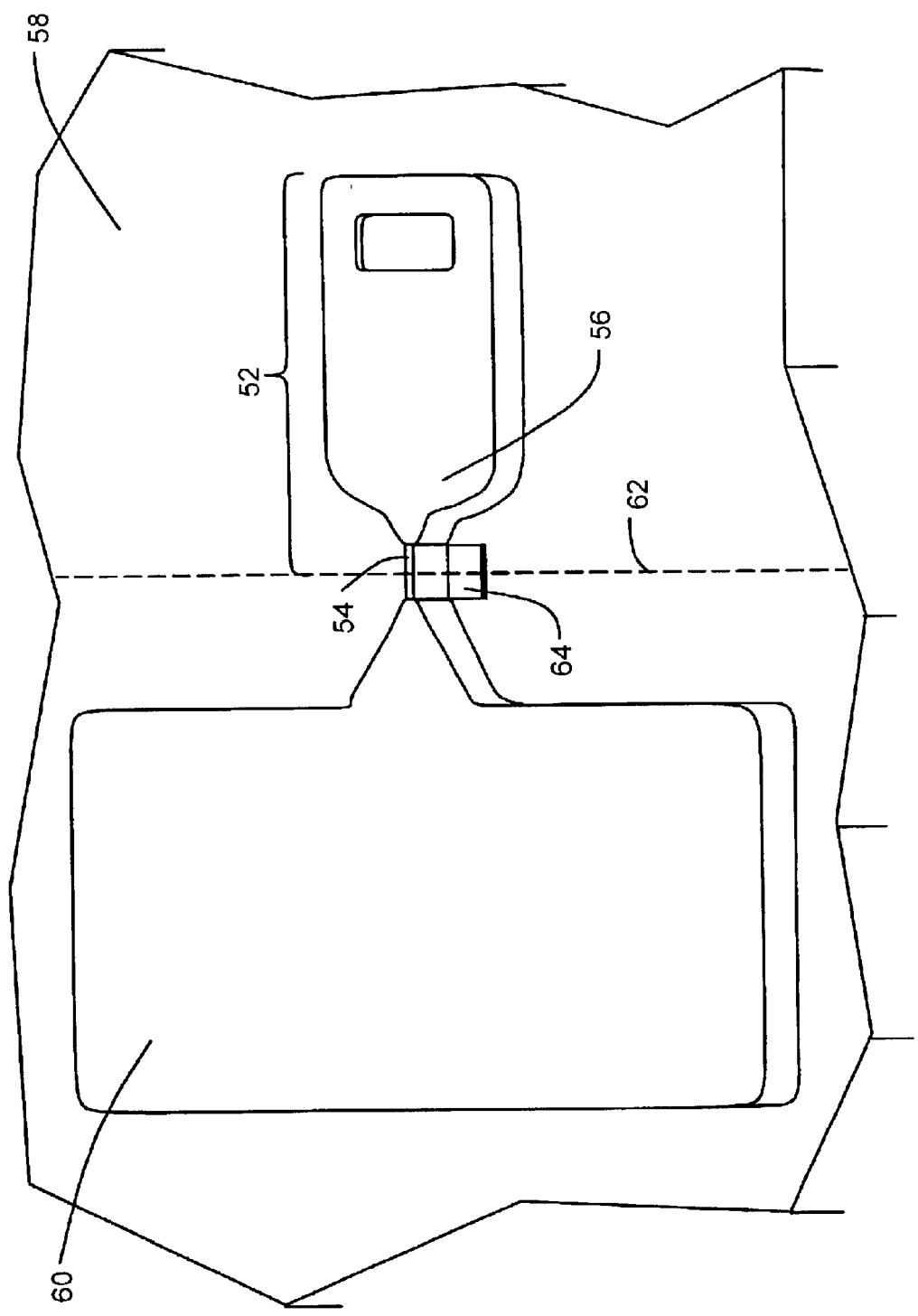
FIG. 3 illustrates a partially completed top write pole that includes a self-assembled write pole tip.

FIG. 3 illustrates a partially completed top write pole 52 that includes a self-assembled write pole tip 54 and a thin film write pole body 56. The top write pole 52 is deposited on an insulating layer 58 along with a thin film layer 60. The self-assembled write pole tip 54 and the thin film write pole body 56 and the insulating layer 58 are formed over a trailing edge surface of a substrate (not illustrated in FIG. 3). After completion of the self-assembled write pole tip 54, the entire assembly shown in FIG. 3 is lapped to form an air bearing surface along dashed line 62. The self-assembled write pole tip 54 is thus aligned with the air bearing surface 62.

The thin film write pole body 56 and the thin film layer 60 can be formed by conventional thin film lithographic processes, however, there is a gap left between the write pole body 56 and the thin film layer 60.

There are generally two steps performed in order to form the self-assembled write pole tip 54 in the gap. Firstly, a self-assembled image layer 64 is formed on the insulating layer 58 that is over the substrate. The self-assembled image layer 64 includes a developed region (hidden from view in FIG. 3) that has a developed width aligned with the (future) air bearing surface 62. Secondly, the self-assembled write pole tip 54 is joined by a self-assembly bond to the developed region. The write pole tip 54 has a pole tip width that is limited to and defined by the developed width in the image layer. The self-assembled image layer 64, the self-assembled write pole tip 54 and the developed region are formed using nanofabrication processes that are explained in more detail below in connection with examples illustrated in FIGS. 4–10.

Figure 4:
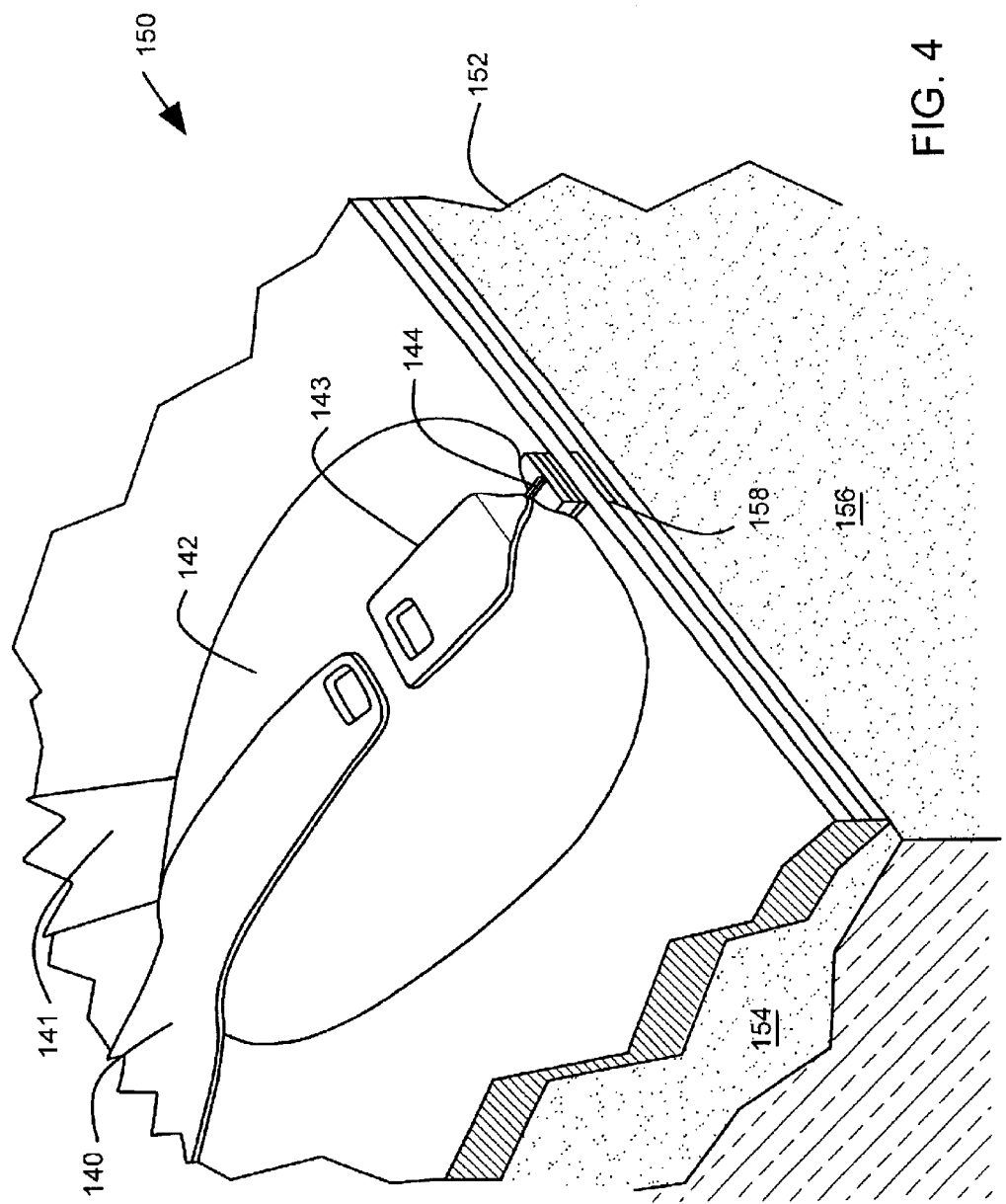
FIG. 4 schematically illustrates a read/write head for a disc drive.
Figure 5:
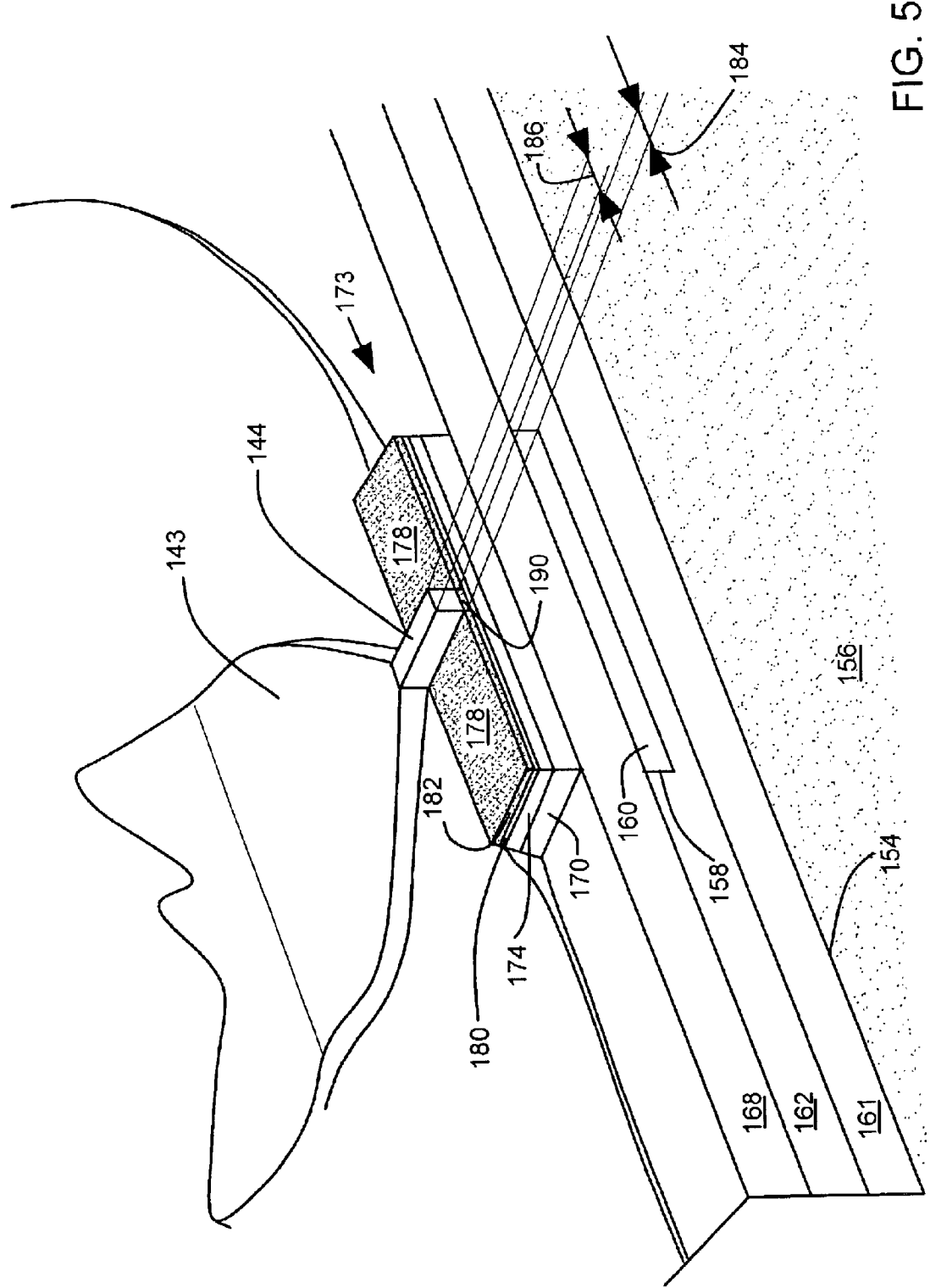
FIG. 5 schematically illustrates a further enlarged view of the read/write head of FIG. 4 showing a self-assembled write pole tip.

FIG. 4 schematically illustrates a portion of a read/write head 150. FIG. 5 schematically illustrates a further enlarged view of a portion of the read/write head 150 shown in FIG. 4. The read/write head 150 can be used to access data on a disc in a disc drive such as disc drive 100 illustrated in FIG. 1.

In FIG. 4, the read/write head 150 includes a slider substrate 152 that has a trailing edge surface 154 and an adjacent air bearing surface 156. The substrate 152 is typically formed of silicon or AlTiC. The trailing edge surface 154 is typically perpendicular to the adjacent air bearing surface 156 as illustrated in FIG. 4. The read/write head 150 includes electrical leads 140, 141 that connect to a write coil (hidden from view in FIGS. 4–5), a top coat insulating layer 142 and a write pole body 143 joined to a write pole tip 144. The read/write head 150 also include a read head 158. The region around the write pole tip 144 is illustrated in further enlargement in FIG. 5.

Referring now to FIG. 5, a write head 173 is formed over the trailing edge surface 154. The write head 173 is not deposited directly on the trailing edge surface 154. The write head 173 is separated from the trailing edge surface 154 by intervening layers such as a bottom shield layer 161, and insulation layers 162, 168. The layers 161, 162, 168 intervene between the write head 173 and the trailing edge surface 154, and thus the write head 173 is said here to be deposited "over" the trailing edge surface 154 rather than "on" the trailing edge surface 154.

The write head 173 includes a shared pole tip 170 that is joined to a shared pole (hidden from view in FIG. 5). Next, a layer 174 is provided on top of the shared pole tip 170. The layer 174 can be an insulating layer or can be a layer of electrically conductive metal. Next, a self-assembled image layer 182 is formed over the layer 174. The self-assembled image layer 182 includes a width-defining region 190 having a developed width 184 aligned with the air bearing surface 156. The width-defining region 190 abuts undeveloped regions 178 that are part of the image layer 182. The write pole tip 144 is joined to the width-defining region 190 by a self-assembly bond. The self-assembly bond is a chemical bond that is made by a self assembly process. The write pole tip 144 has a write pole tip width 186 limited to the developed width 184 by the self-assembly processes described below in connection with examples in FIGS. 6–10. In a preferred embodiment, the write head 173 also includes a seed layer 180 that adapts the upper surface of layer 174 for receiving the image layer 182.

The write pole body 143 has less critical dimensions and can be formed by conventional thin film lithography. The write pole tip 144 has more critical dimensions and is formed by self-assembly processes.

The read head 158 has a read edge surface 160. The read edge surface 160 is aligned generally parallel with the air bearing surface 156 for flying in close proximity to data on a disc (not illustrated in FIGS. 4–5).

Figure 6:
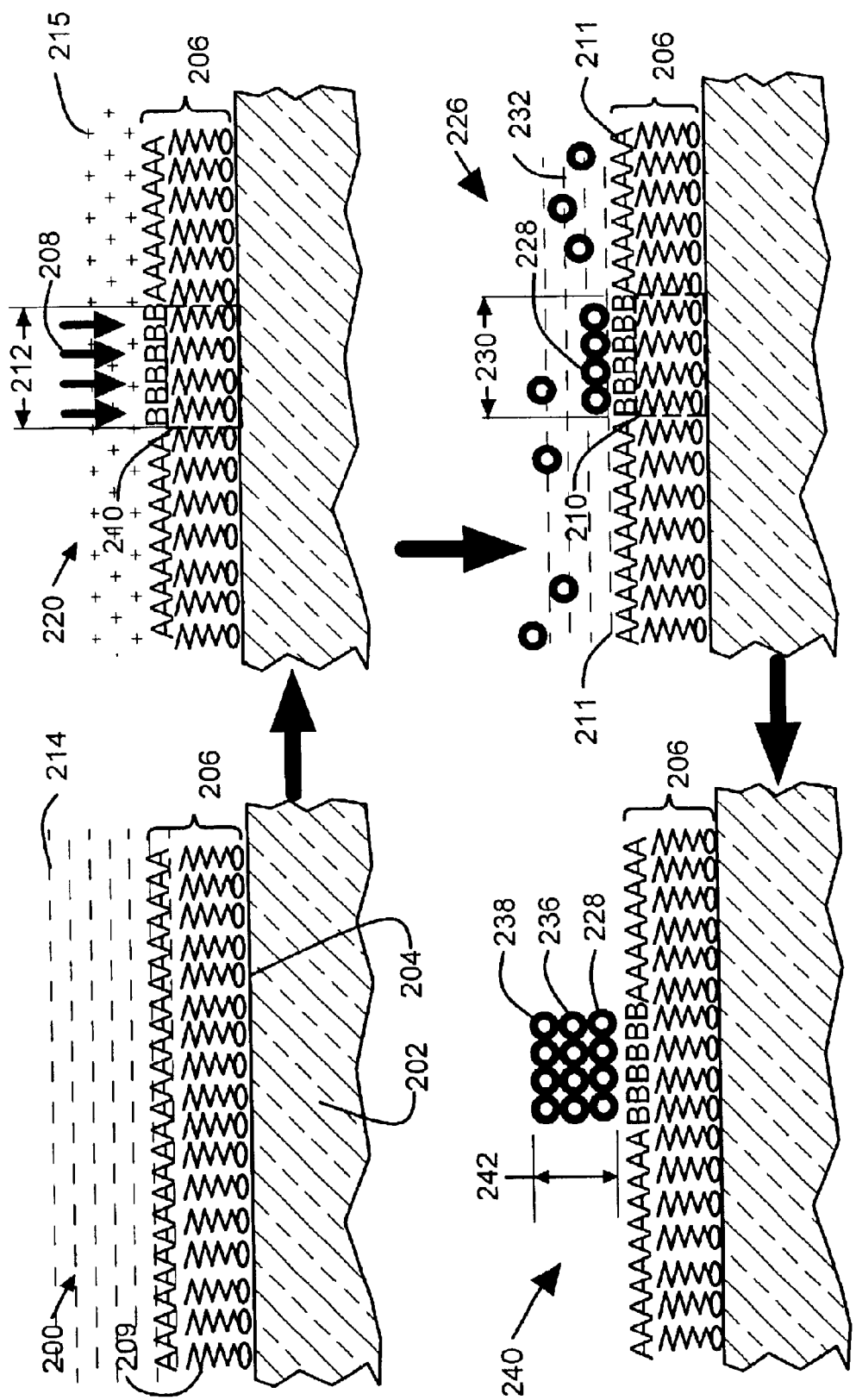
FIG. 6 schematically illustrates two self-assembly processes used to shape a feature of a disc drive component.

FIG. 6 schematically illustrates steps in two self-assembly processes used to shape a feature of a component in a disc drive. The component can be a write head on a disc drive slider or any other disc drive component that includes features that requires very narrow linewidths. The feature can be a write pole tip, nanowires or any other feature of a disc drive component that is adaptable to use of two self-assembly processes similar to those shown in the present application.

As illustrated at first process 200, a component substrate 202 includes a substrate surface 204. The substrate can be formed of silicon, metal or a metal alloy. The component substrate 202 can also be formed of AlTiC that includes a metal seed layer at the substrate surface 204. The component substrate 202 can also be a layer that is deposited over another substrate. A self-assembled image layer 206 is formed over the substrate surface 204. The self-assembled image layer 206 is preferably a self-assembled organic monolayer. The self-assembled image layer 206 is typically deposited from a solution 214 in contact with the substrate surface 204. Individual molecules of the self-assembled image layer 206 include ligands 209. Ligands 209 include a chemical group A that is at the top exposed surface of the image layer 206. The group A is typically a —$CH_3$ group.

As illustrated at process 220, radiation 208 is selectively applied in a lithographic pattern to the self-assembled image layer 206. The radiation selectively alters a chemical property of the group A of the self-assembled image layer 206 in only a developed region 210 that receives the radiation 208. The developed region 210 defines a developed width 212, which as illustrated can be on the order of only a few molecules wide. The developed region 210 is defined or patterned lithographically by carefully controlling the areas exposed to radiation. The radiation, typically applied in a vacuum, chemically alters the chemical properties of groups A in the developed region 210. Areas that are exposed to radiation undergo a chemical transformation that alters the surface chemistry of the image layer. An exposed width in the image layer defines a feature width in a subsequent process. After the exposure to radiation 208, the component substrate is moved into an atmosphere 215. The atmosphere 215 includes atoms or molecules that chemical react with the altered groups in the developed region 210 to form new groups B that have altered chemical properties. In the example where the A group is a —$CH_3$ group, the atmosphere 215 can include oxygen that reacts to form B groups that are typically —OH, —CHO or —COOH groups. The radiation 208 provides energy needed to alter the A groups so that a subsequent reaction can take place with the atmosphere 215. The radiation 208 provides energy to break individual chemical bonds in the A groups and a sharply defined width 212 is achieved. The width definition process does not rely on bulk heating of the imaging layer 206 that would result in poorly defined edges and widths.

In a preferred arrangement, the chemical property of the self-assembled image layer 206 that is altered in the developed region 210 is wettability. In this preferred arrangement, the self-assembled image layer 206 is formed of a material that is initially hydrophobic, and after the developed region 210 is exposed to the radiation 208 and the atmosphere 215, then the developed region 210 is altered chemically to be hydrophillic. In areas that were not exposed to the radiation 208, the ligands "A" are not altered and are hydrophobic. In areas that were exposed to the radiation 208, the ligands "B" are altered and are hydrophillic. In the arrangement shown at 220, a first self-assembly process of the self-assembled image layer 206 is completed.

As illustrated at process 226, a feature layer 228 is self-assembled over the self-assembled image layer 206. The image layer 206 is exposed to a solution 232 that comprises nanoparticles. The feature layer 228 is formed of nanoparticles coming out of the solution and selectively joining by a self-assembly process to the groups B in developed region 210. The feature layer 228 has a feature width 230 that is limited to the developed width 212. The feature layer 228 selectively attaches to the developed region 210 because of the altered chemical property of groups B. The altered chemical property of the developed region 210 is typically that the groups B are hydrophillic, while the groups A outside the developed region 210 are hydrophobic. The width 212 of the developed region thus defines the feature width 230 of the feature layer 228. The feature layer 228 can be complete as a monolayer as illustrated at process 226. In one preferred arrangement, the feature layer 228 is a magnetic feature, and comprises a monolayer of self-assembled magnetic nanoparticles. The process 226 completes a second level of self-assembly. The undeveloped portions 211 (corresponding to undeveloped regions 178 in FIG. 5) of the self-assembled image layer 206 (and any underlying seed layer) may be removed to facilitate deposit (using other processes) of further layers of the read/write head.

As illustrated at process 240, however, the thickness of the feature layer can be increased with a plurality of monolayers 228, 236, 238 of self-assembled nanoparticles. The aspect ratio, in other words the ratio of the thickness 242 to the width 230 can be very precisely controlled by controlling the number of monolayers 228, 236, 238 in the feature layer.

The principle of two levels of self-assembly is shown in FIG. 6. Self-assembled monolayers (SAMs) are formed on the surface of a substrate, and the SAMs are patterned in the plane of the substrate with regions of different chemical functionality using advanced lithographic tools, e.g. electron beam writing, extreme ultraviolet (EUW) lithography, X-ray lithography or ion beam lithography.

Regions of the self-assembled image layer that are exposed to radiation undergo a chemical transformation that alters the surface chemistry (or chemical reactivity) of the self-assembled image layer. Then, magnetic nanoparticles, such as Co, Fe, CoFe, CoNiFe, CoPt, and FePt are self-assembled layer-by-layer into the exposed regions to form nanostructures. The nanostructures may be used to fabricate nanohead devices, e.g. write top pole, read sensor layer or as a nanotemplate (hard mask layer) for pattern transfer into underlying materials.

The material in the feature layer 228 is not limited to spherical magnetic or nonmagnetic nanoparticles, but can also include magnetic or nonmagnetic materials that are rod-shaped nanoparticles. The aspect ratio of self-assembled features can be controlled by the number of self-assembled layers. Also, layer by layer, materials can be the same, or they may be a different material in each layer. Such control allows fabrication of a variety of functional nanostructures.

Electron beam writing has a resolution of less than 10 nm. Other radiation sources, e.g. EUV, X-ray, or ion beam can also be used as high resolution radiation sources.

Figure 7:
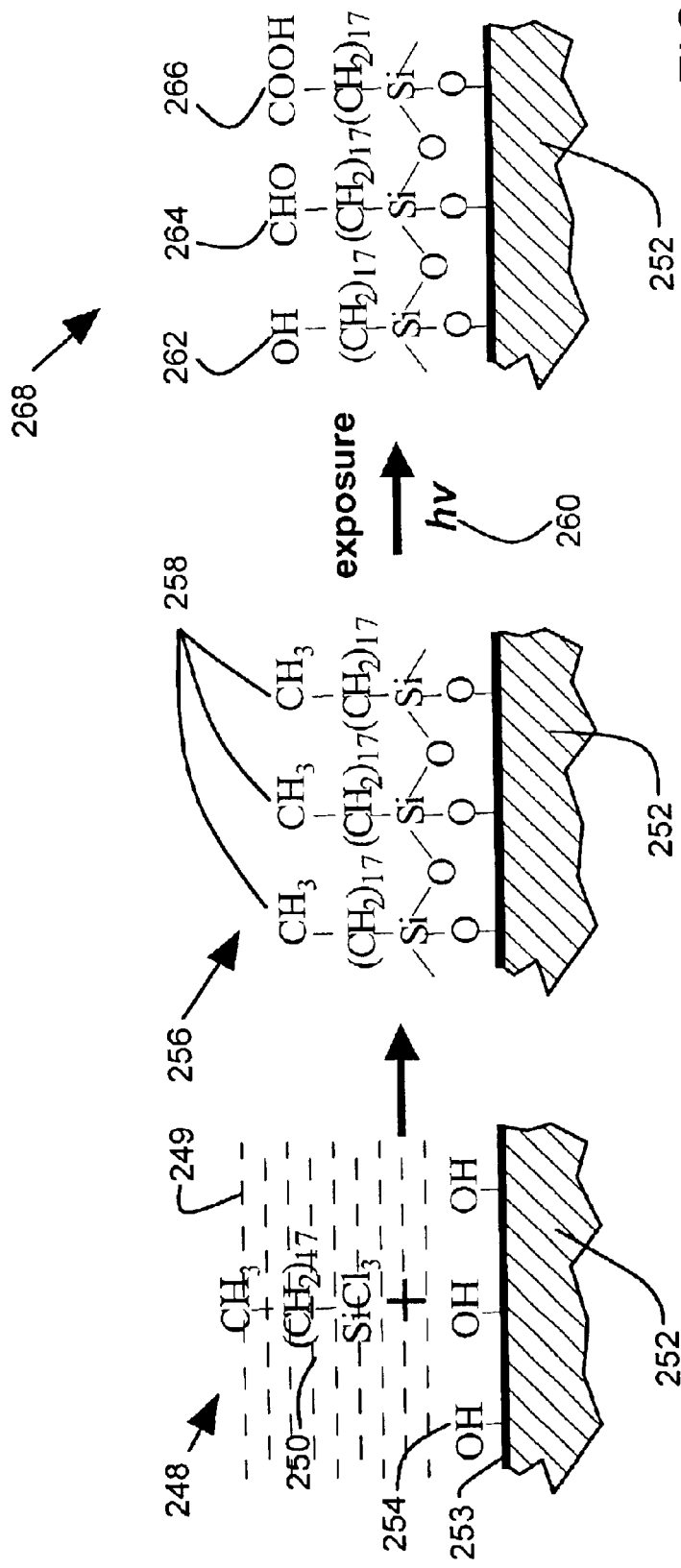
FIG. 7 schematically illustrates a first self-assembly process used to shape a self-assembled image layer of alkylsiloxanes.

FIG. 7 schematically illustrates a detailed example of a first self-assembly level used to form an image layer 256 of alkylsiloxanes 250 on a substrate 252. FIG. 7 also illustrates definition of a developed region 268 in the image layer 256. The alkylsiloxanes 250 are used to form the one molecule thick self-assembled (SA) image layer 256. SA films of alkylsiloxanes are attractive as ultra-thin image layers because they have following advantages:

1) SA films of alkylsiloxanes can form monolayers or near monolayer systems that are driven by natural thermodynamics to form extremely high coverage films with monolayer thickness of 1–2 nm.
2) SA films have a high degree of stability due to the Si—O-substrate covalent linkage, and they can form on technologically relevant substrates 252 such as silicon or oxidized metal surfaces, such as the NiFe substrate for use in magnetic recording devices.
3) SA films of alkylsiloxanes are thermally stable under vacuum up to temperatures of 740K.
4) Siloxane films can be molecularly engineered to be highly sensitive to various types of radiation, including e-beam, deep UV, X-ray and EUV with resolution less than 10 nm.
5) SA films of alkylsiloxanes can be used as ultra-thin resists, to serve as templates for the electroless deposition of metals.

As illustrated at 248 in FIG. 7, the component substrate 252 can be a silicon wafer or an AlTiC wafer that has a native oxide layer coated with a seed layer 253 of NiFe or other suitable material. The seed layer 253 can also comprise materials such as NiV or Ru seeds. The component substrate 252 is first placed in a glass dish and covered with piranha solution ($H_2SO_4$:$H_2O_2$=70:30 (v/v)) at 90 degrees Centigrade. The mixture is heated for an additional 30 min at 90° C. and then cooled to room temperature. The substrate 252 is immediately rinsed with deionized water several times and blown dry with nitrogen. The piranha solution cleans the substrate and leaves the substrate 252 covered with a relatively high density of hydroxyl (OH) groups 254.

Next, the substrate 252, which now has an outer surface with a film of hydroxyl groups 254, is immersed for a few minutes in a dilute solution 249 of the ligand, in other words, a dilute solution of alkylsiloxanes 250. Octadecyltrichlorosilane (OTS), available from Gelest, Inc., 11 East Steel Road, Morrisville, Pa. 19067, is an alkylsiloxane that can be used. Alternatively, SA films can also be deposited from the vapor phase and with spin coating techniques. The monolayer formation can be performed analogous to a wafer priming step with hexamethyldisilazane (HMDS) that is standard practice in most wafer processing systems. The alkylsiloxanes 250 chemically bond to the hydroxyl groups 254 to form an image layer 256 that is a monolayer. The monolayer 256 has terminal groups 258 that are methyl ($CH_3$) groups.

The terminal groups 258, in other words the monolayer surface, is relatively hydrophobic (advancing-contact angle with water is approx. 110°). The monolayer surface can be characterized by an ellipsometer, atomic force microscopy (AFM), X-ray photoelectron spectroscopy (XPS), or contact angle measurements.

Next, lithographically patterned regions of the terminal ($CH_3$) groups 258 are exposed to radiation 260, such as an electron beam, followed by exposure to an atmosphere that comprises oxygen. In the presence of the radiation 260, the methyl groups 258 are chemically altered, and the altered groups 258 combine later with oxygen available in the atmosphere to form new groups such as hydroxyl group (OH) 262, aldehyde group (CHO) 264, and carboxylic acid group (COOH) 266. The portions of the monolayer surface that have been exposed to the radiation are transformed from being relatively hydrophobic to relatively hydrophilic (contact angle with water approximately 20°). A reaction mechanism that explains the incorporation of hydroxyl group 262, aldehyde group 264 and carboxylic acid group 266 on the surface of the $CH_3$-terminated monolayer comprises:

1) free radicals are produced at the surface of the monolayer by removal of a hydrogen in a number of processes involving primary and secondary electrons emitted from the substrate upon irradiation.
2) the free radicals recombine with radical intermediates such as hydrogen, react with neighboring groups to form crosslinks, or react with oxygen to form hyderoxy radicals when the irradiated OTS is removed from the exposure chamber and is exposed to the atmosphere.
3) the hydroperoxy radicals decompose along well-known pathways to generate a mix of products including alcohols, aldehydes and carboxylic acids.

In addition to SA films of alkylsiloxanes, SA films of alkylthiols and octadecyltrichlorosilane can also be used as the image layer.

Figure 8:
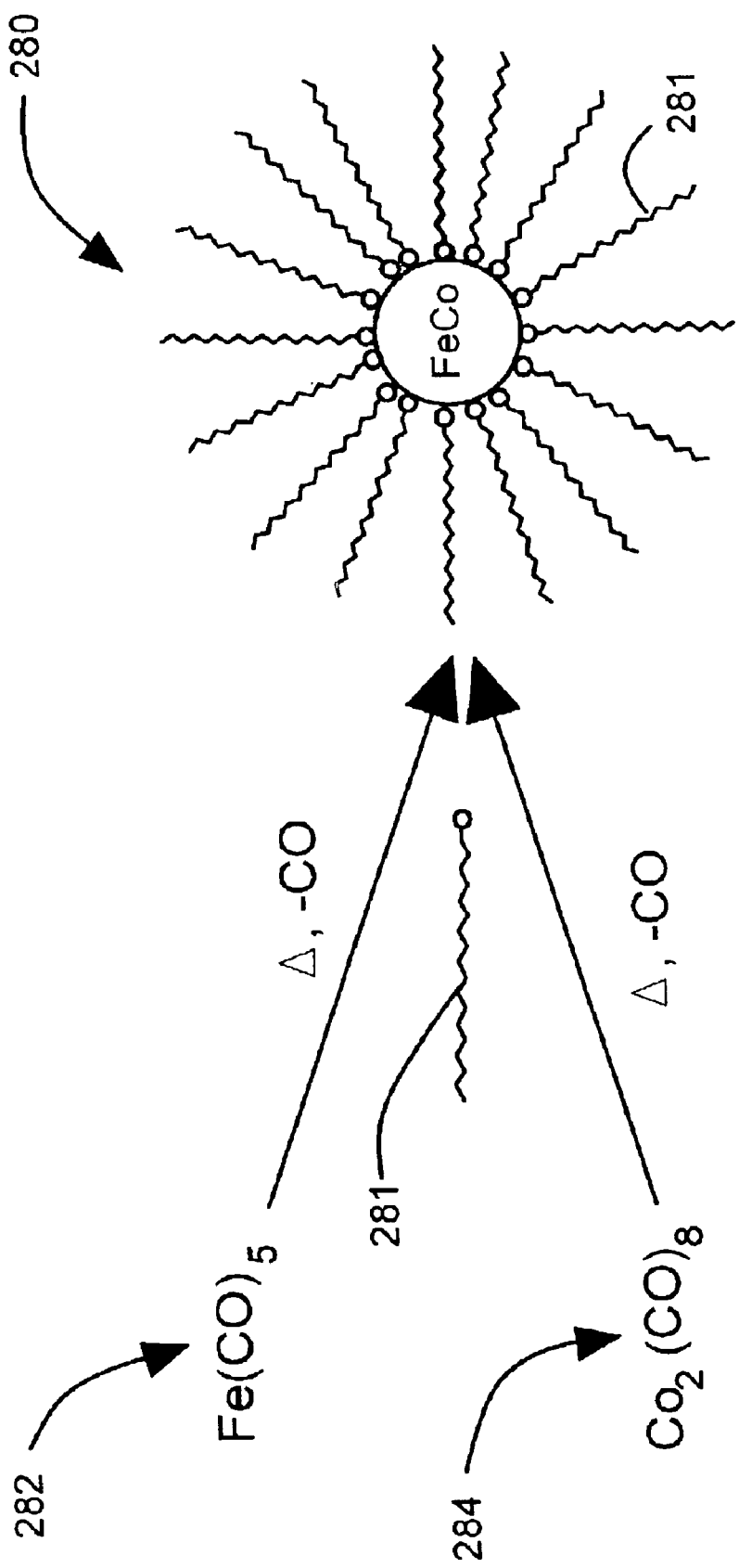
FIG. 8 schematically illustrates a reaction synthesizing FeCo nanoparticles from $Fe(CO)_5$ and $Co_2(CO)_8$ in a solvent in the presence of surfactant.

FIG. 8 schematically illustrates a reaction synthesizing an FeCo nanoparticle 280 from $Fe(CO)_5$ (at 282) and $Co_2(CO)_8$ (at 284) in a solvent in the presence of surfactant 281.

The FeCo nanoparticle 280 is synthesized by decomposition of $Fe(CO)_5$ and $Co_2(CO)_8$ in the solvent such as dioctylether in the presence of surfactant molecules 281 such as oleic acid. Decomposition of the metal carbonyls such as 282 and 284 synthesizes monodispersed (within 10%) nanoparticles 280. The size distribution is helpful to achieve a high quality of self-assembly for head devices.

The size of the nanoparticles 280 can be controlled by varying factors such as chemical reagent concentrations, reaction temperature, the type of surfactants, and the relative amount of precursors 282, 284 and the surfactant 281. Nanoparticles 280 can be achieved with dimensions of 2–3 nm. The chemical composition of nanoparticles 280 can be readily controlled by varying the ratio of $Fe(CO)_5$ and $Co_2(CO)_8$. FeCo alloy has a large saturation magnetization (2.4 T) and can be used as a write head material.

Because the attraction force between the nanoparticle and the functional groups of surfactant molecules around the particles, i.e. —COOH for the oleic acid, is a van der Waals force, this force is not very strong. The surfactant molecules 281 around the particles 280 (in FIG. 8) are easily replaced by other types of surfactant molecules. The surfactant molecules 281 can be replaced, for example, by the functional groups (262, 264, 266 in FIG. 7) from the surface of the image layer. Therefore, when the nanoparticles 280 are later deposited (shown generally at 226 in FIG. 6) onto an image layer on a component substrate, the selected polar functional groups (262, 264, 266 in FIG. 7) with selected polarization power can replace the surfactant molecules around the nanoparticles 280 and form chemical bonds, or at least have strong induced dipole interactions between the particle and the functional groups (262, 264, 266 in FIG. 7) in the developed region. The non-polar functional groups —$CH_3$ on the undeveloped region (258 in FIG. 7) can only provide relatively weak dispersion interactions with the surfactant molecules surrounding nanoparticles 280. Therefore the particles adsorbed in the undeveloped regions can be easily removed by washing the substrate with appropriate solvent. After the washing process, the first layers of particles are built onto the developed regions in the image layer, as shown in FIG. 9.

Figure 9:
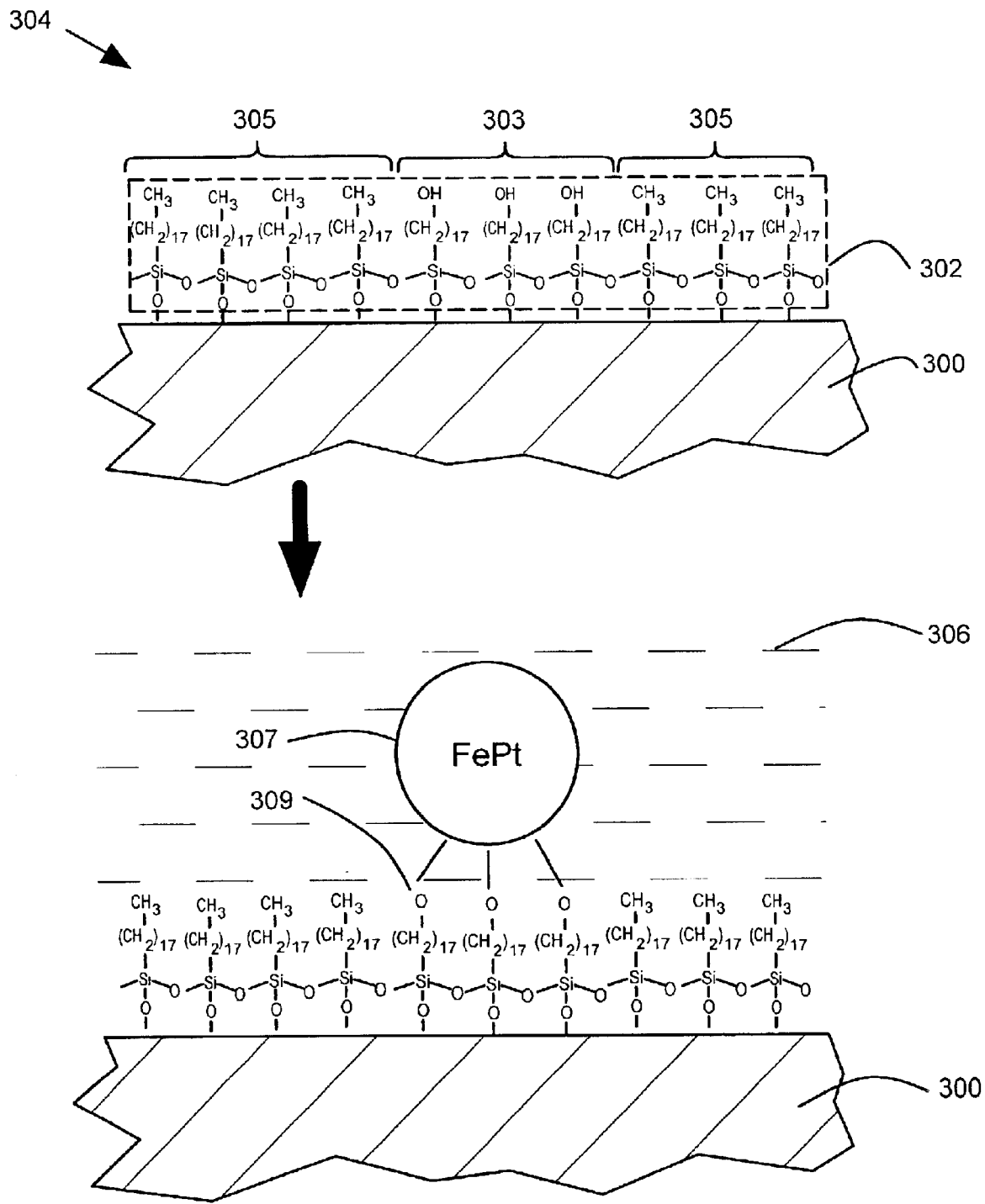
FIG. 9 schematically illustrates a second self-assembly process of immersing a patterned substrate in a solution of solvent and a surfactant.

FIG. 9 schematically illustrates a detailed example of a second self assembly level for forming a feature layer from self assembled nanoparticles. A component substrate 300 has a lithographically patterned image layer 302 deposited on it as illustrated at 304. The image layer 302 has a developed region 303 and non-developed regions 305 that abut the developed regions 303. The component substrate 300 is immersed in a solution 306 of particles 307 to allow particles to self assemble at 309 to the developed regions 303.

The second and subsequent layers of particles can be built up based on the first layer of particles using a method that is similar to the method used to assemble the first particle layer. As explained above, the remaining surfactant molecules (281 in FIG. 8) on the nanoparticles that are relatively weakly bound to the first layer of particles are easily replaced by other kinds of functional surfactant molecules (FSM) as discussed in more detail below. Therefore, the first layer of particles can be chemically modified with FSM by immersing the sample into a solution of FSM. However, the attraction force between the image layer terminated with —$CH_3$ in the undeveloped regions and FSM is physical adsorption, so the FSM adsorbed in the undeveloped regions can be removed by a washing process. The process for the second layer of particle assembly involves:

1) modification of the first layer of particles with functional surfactant molecules (FSM) by exchanging oleic acid/oleylamine around the particles with FSM;
2) deposition of second layer particles onto the first layer particles whose surface was modified by functional surfactant molecules (FSM). This kind of surface modification process has been successfully demonstrated using various surface chemistry functionalization techniques. Research has shown that several surfactant molecules can replace oleic acid/oleylamine around the nanoparticles particles with FSM to give various functional surfactant molecules-protected particles.

Figure 10:
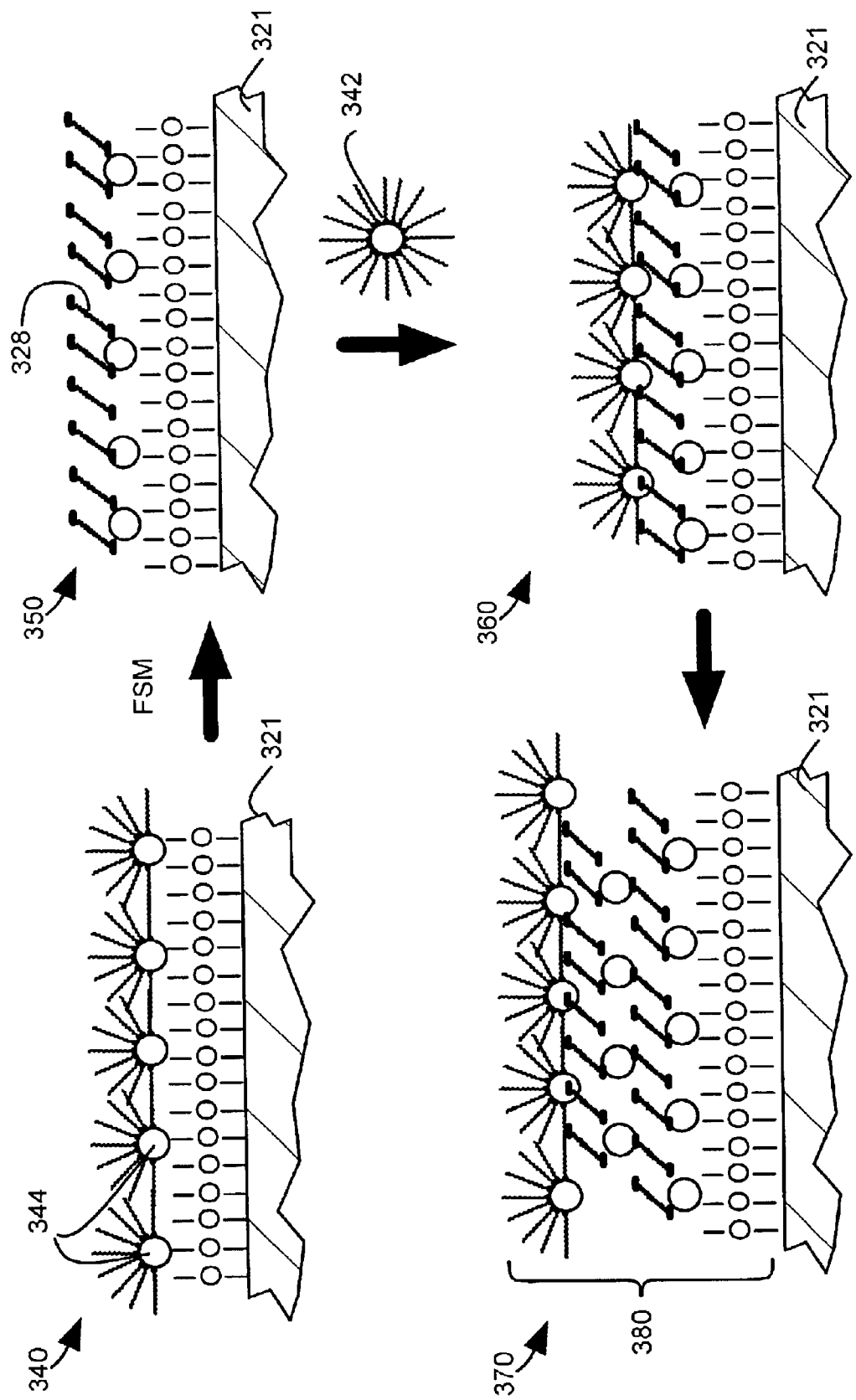
FIG. 10 schematically illustrates a process of self assembling subsequent particle layers, layer by layer, onto a first particle layer.

FIG. 10 schematically illustrates a detailed example of the layer-by-layer self assembly process of subsequent layers of particles on the first particle layer at 340. Using the process shown in 306 in FIG. 9, the first monolayer of particles 344 are formed on the developed regions in the image layer on a substrate 321. Then, by surface modification of the first layer of nanoparticles 344 (that correspond with 307 in FIG. 9) with FSM 328, the first layer of nanoparticles are covered by the functional surfactant molecules (FSM), which is illustrated at 350 in FIG. 10. Then, in process 360, deposition of particles 342 onto the FSM-modified first particle layer forms the second layer of particles. The particles absorbed in the undeveloped regions can be easily removed by washing process (as mentioned in the assembly process of the first layer of particles in FIG. 9). By continuing the above process 340 as shown at successive process 370, a multi-layer assembly 380 is formed.

There are a variety of benefits that can be achieved using the embodiments and processes illustrated in FIGS. 3–10:

1. AlTiC slider substrates and AlTiC slider substrates that are coated with various seed layers (NiFe, NiV, Ru) can be chemically modified using self-assembled monolayers of alkylsiloxanes that terminate with different chemical function groups to achieve different chemical properties.
2. Alkylsiloxanes self-assembled image films can be modified with electron beam radiation to alter surface properties to facilitate self-assembly of features with well defined narrow widths.
3. Advanced lithography can be used to precisely register self-assembly of nanoparticles with other features of a head.
4. The feature layers can be ultra-thin and can be used with spherical or rod shaped nanoparticles.
5. Multiple monolayers of nanoparticles can be formed using the same material or using different materials in different monolayers in the same feature.
6. Self-assembly process can be used to fabricate multiple features such as top pole, shared pole, bottom pole, reader layer in one read/write head.
7. The self-assembled feature films can serve as nanoscopic templates for nanofabrication.

In summary, an embodiment of a write head (110, 173) for accessing data on a disc (106) in a disc drive (100) is disclosed. The write head has a substrate (152) with a trailing edge surface (154) and an air bearing surface (156). A self-assembled image layer (64, 182) is formed over the substrate. The self-assembled image layer includes a developed region (190, 210) having a developed width (184, 212) aligned with the air bearing surface. The head has a write pole (52, 143–144) that includes a write pole tip (54, 144) that is joined by a self-assembly process to the developed region. The write pole tip has a pole tip width (186, 230) that is limited to the developed width.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the nanofabricated disc component while maintaining substantially the same functionality without departing from the scope and spirit of the present invention. In addition, although preferred embodiments described herein are directed to a write pole tip, it will be appreciated by those skilled in the art that the teachings of the present invention can be applied to nanowires, microactuators, position and velocity sensors for disc drives, without departing from the scope of the present invention.

What is claimed is:

1. A write head for accessing data on a disc in a disc drive, comprising:

a substrate having a trailing edge surface and an air bearing surface;

a self-assembled image layer that comprises an organic monolayer that is formed over the trailing edge surface, the self-assembled image layer including a developed region having a developed width aligned with the air bearing surface; and a write top pole including a write pole tip that is joined by a self-assembly bond to the developed region, the write pole tip having a pole tip width that is limited to the developed width.

2. The write head of claim 1 wherein the self-assembled image layer comprises a patterned monolayer.

3. The write head of claim 1 wherein the write pole tip comprises a monolayer of self-assembled magnetic nanoparticles.

4. The write head of claim 3 wherein the write pole tip comprises a plurality of monolayers of self-assembled magnetic nanoparticles.

5. The write head of claim 4 wherein the plurality of monolayers are each formed of the same material.

6. The write head of claim 4 wherein the plurality of monolayers include monolayers that are not all formed of the same material.

7. The write head of claim 4 wherein the plurality of monolayers comprise nanoparticles having a spherical shape.

8. The write head of claim 4 wherein the plurality of monolayers comprise nanoparticles having a rod shape.

9. The write head of claim 1 further comprising a seed layer, and the image layer is formed on the seed layer.

10. The write head of claim 9 wherein the seed layer comprises a material selected from the group of NiFe, NiV and Ru.

11. The write head of claim 1 wherein the write pole tip has an aspect ratio of at least 10:1.

12. The write head of claim 1 wherein the self-assembled image layer defines a developed width of no more than 30 nanometers.

13. The write head of claim 1 wherein the self-assembled image layer comprises an alkylsiloxane.

14. The write head of claim 1 wherein the self-assembled image layer comprises an alkylthiol.

15. The write head of claim 1 wherein the self-assembled image layer comprises octadecyltrichlorosilane.

16. The write head of claim 1 wherein the write pole further comprises a thin film write pole body.

17. A magnetic component for use in a disc drive, comprising:

a component substrate having a substrate surface;

a self-assembled image layer that comprises an organic monolayer that is formed over the substrate surface, the self-assembled image layer including a developed region defining a developed width; and a magnetic feature layer that is self-assembled over the self-assembled image layer, the feature layer being joined by a self-assembly bond to the developed region, the feature layer having a feature width that is limited to the developed width.

18. The magnetic component of claim 17 wherein the self-assembled image layer comprises a patterned monolayer.

19. The magnetic component of claim 17 wherein the magnetic feature layer comprises a monolayer of self-assembled magnetic nanoparticles.

20. The magnetic component of claim 17 wherein the magnetic feature layer comprises a plurality of monolayers of self-assembled magnetic nanoparticles.

21. The magnetic component of claim 17 wherein the component substrate is a slider in the disc drive.

22. The magnetic component of claim 17 wherein the component substrate is a disc in the disc drive.

23. A magnetic component for use in a magnetic data storage device, comprising:

a component substrate having a substrate surface;

a self-assembled image layer that comprises an organic monolayer that is formed over the substrate surface, the self-assembled image layer including a developed region defining a developed width; and a magnetic feature layer that is self-assembled over the self-assembled image layer, the magnetic feature layer being joined by a self-assembly bond to the developed region, the magnetic feature layer having a feature width that is limited to the developed width.

24. The magnetic component of claim 23 wherein the self-assembled image layer comprises a patterned monolayer.

25. The magnetic component of claim 23 wherein the magnetic feature layer comprises a monolayer of self-assembled magnetic nanoparticles.

26. The magnetic component of claim 23 wherein the magnetic feature layer comprises a plurality of monolayers of self-assembled magnetic nanoparticles.

27. The magnetic component of claim 23 wherein the component substrate comprises a read/write head in the magnetic data storage device.

28. The magnetic component of claim 23 wherein the component substrate comprises magnetic media in the magnetic data storage device.

29. The magnetic component of claim 23 wherein the magnetic feature layer comprises part of a transducer.

* * * * *